(12) United States Patent
Henriksson et al.

(10) Patent No.: US 10,694,770 B2
(45) Date of Patent: Jun. 30, 2020

(54) CHAMBER FOR PULSED ELECTRIC FIELD GENERATION

(71) Applicant: Arc Aroma Pure AB, Lund (SE)

(72) Inventors: Pär H Henriksson, Lund (SE); Per Lilja, Limhamn (SE)

(73) Assignee: Arc Aroma Pure AB, Lund (SE)

( * ) Notice: Subject to any disclaimer, the term of this patent is extended or adjusted under 35 U.S.C. 154(b) by 248 days.

(21) Appl. No.: 15/567,292

(22) PCT Filed: Apr. 20, 2016

(86) PCT No.: PCT/SE2016/050343
§ 371 (c)(1),
(2) Date: Oct. 17, 2017

(87) PCT Pub. No.: WO2016/171610
PCT Pub. Date: Oct. 27, 2016

(65) Prior Publication Data
US 2018/0116256 A1    May 3, 2018

(30) Foreign Application Priority Data
Apr. 21, 2015  (SE) ...................................... 1550474

(51) Int. Cl.
*C02F 1/46*    (2006.01)
*A23L 3/32*    (2006.01)
(Continued)

(52) U.S. Cl.
CPC ............... *A23L 3/32* (2013.01); *B01J 19/087* (2013.01); *B01J 19/26* (2013.01); *C02F 1/487* (2013.01);
(Continued)

(58) Field of Classification Search
CPC ...... A23L 3/00; A23L 3/26; A23L 3/32; C02F 2103/003; C02F 2303/04; C02F 1/48; C02F 2201/48; C23C 24/00
See application file for complete search history.

(56) References Cited

U.S. PATENT DOCUMENTS 3,373,099 A    3/1968  Kennedy
5,597,456 A    1/1997  Maruyama et al.
(Continued)

FOREIGN PATENT DOCUMENTS

CN    101502304 A  *  8/2009
EP    2052743 A1      4/2009
(Continued)

OTHER PUBLICATIONS

European Supplementary Search Report on application No. EP17786252 dated Aug. 22, 2019.
(Continued)

*Primary Examiner* — Cameron J Allen
(74) *Attorney, Agent, or Firm* — Moser Taboada

(57) ABSTRACT

The present invention describes a PEF (pulsed electric field) chamber, said PEF chamber 1 comprising a tube 2 with two open ends 3, 4 having attachment means 5, 6 enabling the PEF chamber 1 to be a plug-in device, wherein the tube 2 has a length L from one open end 3 to the other open end 4 and an inner width IW from one side of the tube to the other side of the tube in a cross section being perpendicular to the length L thereof, wherein the tube 2 has a geometrical narrowing of the inner width IW somewhere along the length L of the tube 2, and wherein the PEF chamber 1 comprises a grid 9 of an insulating material being arranged at the geometrical narrowing or electrode units 7, 8 being arranged opposite each other at the geometrical narrowing of the inner width IW along the length L of the tube 2. The plug-in feature of the present invention renders the PEF
(Continued)

chamber to function as an 1 attachable and disposable PEF chamber.

17 Claims, 7 Drawing Sheets

(51) Int. Cl.
    *C02F 1/48*     (2006.01)
    *B01J 19/26*     (2006.01)
    *B01J 19/08*     (2006.01)
    *C02F 11/00*     (2006.01)
    C02F 103/00     (2006.01)
    C02F 11/06     (2006.01)

(52) U.S. Cl.
    CPC ........... *C02F 11/00* (2013.01); *A23V 2002/00* (2013.01); *B01J 2219/083* (2013.01); *B01J 2219/0837* (2013.01); *C02F 11/06* (2013.01); *C02F 2103/008* (2013.01)

(56) References Cited

U.S. PATENT DOCUMENTS

| | | | |
|---|---|---|---|
| 5,662,031 | A | 9/1997 | Qin et al. |
| 5,690,978 | A * | 11/1997 | Yin .................... A23L 3/00 |
| | | | 426/237 |
| 5,690,987 | A | 11/1997 | Yin et al. |
| 5,927,069 | A | 7/1999 | Wang et al. |
| 6,110,423 | A | 8/2000 | Bushnell et al. |
| 2007/0000790 | A1* | 1/2007 | Morales ............... C02F 1/4672 |
| | | | 205/742 |
| 2010/0112151 | A1* | 5/2010 | Bluestein ................ A23L 3/32 |
| | | | 426/244 |
| 2012/0228141 | A1* | 9/2012 | Jung ...................... B01D 43/00 |
| | | | 204/456 |
| 2014/0353223 | A1* | 12/2014 | Nishimura ............ C02F 1/4608 |
| | | | 210/96.1 |
| 2015/0232353 | A1* | 8/2015 | Denvir ................. C02F 1/4672 |
| | | | 210/748.19 |

FOREIGN PATENT DOCUMENTS

| | | |
|---|---|---|
| JP | H08-057038 A | 3/1996 |
| JP | 2009-119347 A | 6/2009 |
| JP | 2010-022991 A | 2/2010 |
| JP | 2011-501947 A | 1/2011 |
| JP | 2013-123656 A | 6/2013 |
| JP | 2014-113517 A | 6/2014 |
| JP | 2016-081676 A | 5/2016 |
| RU | 2367616 C2 | 9/2009 |
| RU | 2454265 C1 | 6/2012 |
| WO | WO-1999050186 A1 | 10/1999 |
| WO | WO-03056941 A1 | 7/2003 |
| WO | WO-2006/121397 A | 11/2006 |
| WO | WO-2006/121397 A1 | 11/2006 |
| WO | WO-2009126084 A1 | 10/2009 |
| WO | WO-2012/044875 A1 | 4/2012 |
| WO | WO-2016/171810 A1 | 10/2016 |

OTHER PUBLICATIONS

Supplementary European Search Report dated Oct. 24, 2018 for Application No. EP-16783500.
International Search Report dated Jun. 21, 2016 for PCT Application No. PCT/SE2016/050343.
Russian Intellectual Property Search Report on application No. 2017135593/05(062038) dated Aug. 26, 2019.
GOST 20700-75 Bolts, studs, nuts and washers for flange and anchor joints, plugs and clamps with a medium temperature from 0 to 650° C. Specifications (as Amended by N 1, 2, 3), dated—Jan. 1, 1976.

* cited by examiner

CHAMBER FOR PULSED ELECTRIC FIELD GENERATION

FIELD OF THE INVENTION

The present invention relates to a chamber for pulsed electric field generation.

TECHNICAL BACKGROUND

There are known arrangements involving chambers for pulsed electric field generation. One example is described in WO 2009/126084, which discloses an arrangement for neutralisation of microorganisms. The arrangement comprises at least one non-conducting chamber for pumping a pumpable medium, which chamber is provided with a first and a second electrode plate. In the description of WO 2009/126084 there is stated that the chamber of the arrangement can be an over-pressure pump that is connected to a feeding inlet pipe and discharge outlet pipe. The over-pressure pump of the arrangement may be a piston pump with a piston whose upper part forms one of the electrode plates. This is said to be an advantageous example because the electrode plates can be easily integrated into a standard pump device. Furthermore, there is also disclosed in WO 2009/126084 that the invention therein can be exercised also by the use of a pump in which the enclosed chamber and the two electrodes are designed as a flexible insertion located between a moving piston and a fixed wall or a second movable piston with a reversed movement. Such possibilities are disclosed as e.g. a pump similar to that of an infusion bag or a disposable cartridge.

There are also other documents disclosing pumps for use in PEF systems. One example is disclosed in WO 03/056941 which relates to a method and arrangement for continuous treatment of a pumpable substance with an electric field. There is mentioned that positive displacement pumps may be part of the arrangement. Examples are lobe rotor pumps and gear pumps.

One aim of the present invention is to provide an improved chamber for pulsed electric field generation (called PEF chamber in the following). The PEF chamber according to the present invention has several advantages when comparing to the existing alternatives, such as inter alia easy to install and replace by another one, easy to incorporate in a PEF system together with other user add-ons, which are further disclosed below, and provides a simplified production of the PEF chamber as such.

SUMMARY OF THE INVENTION

The stated purpose above and advantages described are achieved by a PEF (pulsed electric field) chamber, said PEF chamber comprising a tube with two open ends having attachment means enabling the PEF chamber to be a plug-in device, wherein the tube has a length L from one open end to the other open end and an inner width IW from one side of the tube to the other side of the tube in a cross section being perpendicular to the length L thereof, wherein the tube has a geometrical narrowing of the inner width IW somewhere along the length L of the tube, and wherein the PEF chamber comprises a grid of an insulating material being arranged at the geometrical narrowing or electrode units being arranged opposite each other at the geometrical narrowing of the inner width IW along the length L of the tube (2).

The attachment disclosed above may be of many different types and may of course be of a different type on respective open end of the tube. As an example, threaded connections may be one alternative to use for the disposable PEF chamber and the connections into which the PEF chamber should be connected.

Moreover, it may also be mentioned that the two, or more, as further discussed below, electrode units may comprise a regular electrode pair or two opposite electrode bars.

The medium under treatment should be pressurized so that the risk of air bubbles or gas in the medium is eliminated. In WO 2009/126084 and WO 03/056941 this is obtained by use of pumps. According to the present invention this is, however, obtained by having a narrowing of the actual PEF chamber at the site of the opposite electrodes. This is a solution that provides several advantages, such as a simplified production and PEF system as a whole when comparing to the need of a PEF chamber in the form of a pump. The pump installation in a PEF system according to the present invention may be of any suitable type and be held totally outside of the actual PEF unit. Moreover, the present invention provides as a disposable unit which has several advantages in itself, such as decreased time adjusting time when there is a need for replacing the PEF chamber, and increased possibility for easy installation and incorporation of add-ons relating to the disposable unit.

In relation to the above description it may further be mentioned that WO 03/056941 does not only point away from the present invention in terms of having a pump in the system. In the arrangement disclosed in WO 03/056941 it is further suggested that the separated space in which the medium is to be treated has a cylindrical shape, i.e. points away from providing any form of geometrical construction limitation (narrowing). It should further be said that there is neither any such shapes suggested in WO 2009/126084. Once again, both of WO 2009/126084 and WO 03/056941 are directed to using pumps as the PEF chambers.

There is another PEF chamber which has a geometrical construction limitation (narrowing) along the tubing thereof. This is disclosed in U.S. Pat. No. 6,110,423 in which there is disclosed a system for deactivating organisms in a food product, said system comprising a first electrode; an insulator section coupled to the first electrode, where the insulator section includes an insulator pinch, an opening, and a transition region interposed therein between, and where the opening has a larger cross-sectional area than the insulator pinch, the insulator section including a cavity, passing through the insulator pinch, the transition region, and the opening, and where the system also comprises a second electrode coupled to the insulator section, where the first electrode is positioned on a first side of the insulator pinch, and the second electrode is positioned on a second side of the insulator pinch.

There are several very clear and important differences between the present invention and the system disclosed in U.S. Pat. No. 6,110,423. First of all, the opposite electrodes are provides at the narrowing along the tube of the PEF chamber according to the present invention. This is not the same according to the system of U.S. Pat. No. 6,110,423 where it is very clear that the pinch or narrowing actually is an insulator and the electrodes are provides in front of and after the pinch. This also hints a second very important difference. The electric field provided in the system of U.S. Pat. No. 6,110,423 is in series, however an electrical field provided in a PEF chamber according to the present invention is in parallel. Furthermore, the intention of the pinch of U.S. Pat. No. 6,110,423 is to provide a delimited electrode surface. However, the narrowing according to the present invention is provided as a geometrical construction limitation to provide a pressure build up which is of interest when the actual PEF is applied. This direction is not intended or hinted in U.S. Pat. No. 6,110,423.

In CN 101502304 there is provided a high-voltage pulse electric field processing chamber comprising an insulating hollow tube, 2 circular-arc metal electrodes and a semiconductor material. As notable from FIG. 1 the electrodes are inserted as to form a tapered part of the tube. This may be seen clearly in FIG. 2. By this arrangement it should be possible to use smaller electrodes and as such also decrease the exposure of metal surfaces being in contact with the liquid being processed. However, and as said before, the narrowing according to the present invention is provided as a geometrical construction limitation to provide a pressure build up to eliminate the risk of air bubbles or gas in the medium when the actual PEF is applied. This is not the intention of CN 101502304 and the provided arrangement therein does not seem to be able to provide the necessary pressure build up. Moreover, it is clear that it is the electrodes as such that create the tapered portion of the tube according to CN 101502304 and then the ends of the electrodes are in contact also with the liquid going into the tapered part.

Furthermore, in U.S. Pat. No. 5,690,978 there is provided a PEF treatment device intended for the sterilization and preservation of pumpable food products, which device has at least two electrodes and an insulator, and which is said to be particularly suited for the inactivation of vegetative and bacterial spore microorganisms. The electrode and insulator flow chambers is said to employ a variety of sectional and cross-sectional geometries including tubular, cylindrical, rectangular, elliptical and non-uniform design. One such is shown in FIG. 4 in U.S. Pat. No. 5,690,978, which has a tapered flow chamber. As seen in FIG. 4, the electrodes are not arranged in the tapered portion of the flow chamber. This differs clearly from the present invention. According to the present invention a grid of an insulating material or electrode units are arranged opposite each other at the geometrical narrowing of the inner width IW along the length L of the tube. As understood from above, it is a key feature of the present invention to provide the narrowing to ensure the pressure build up and also to arrange the grid or the opposite electrodes within this narrowing to ensure that it is here the actual PEF is applied in the PEF chamber.

BRIEF DESCRIPTION OF THE DRAWINGS

Moreover.

SPECIFIC EMBODIMENTS OF THE INVENTION

Figure 1:
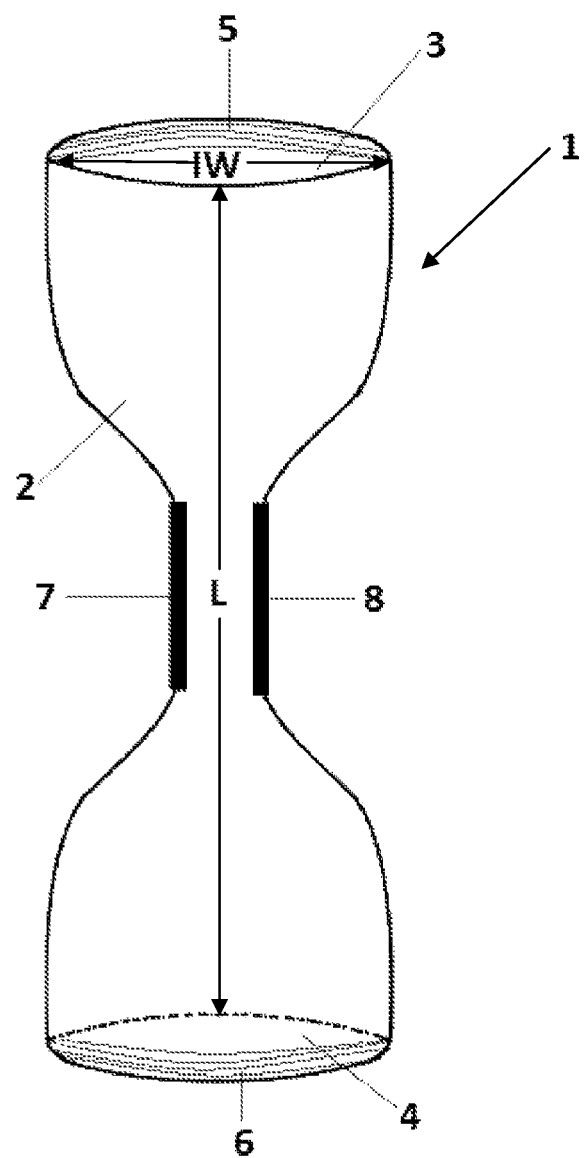
FIG. 1 shows a PEF chamber according to one specific embodiment of the present invention.

Below some specific embodiments of the present invention are disclosed.

According to one specific embodiment of the present invention, the tube of the PEF chamber is non-conductive. This is a further difference when comparing to U.S. Pat. No. 6,110,423 in which the tube is conductive with its electrodes but where an insulator portion is provided as a pinch.

The geometrical construction limitation or the narrowing of the tube according to the present invention may have different shapes. According to one specific embodiment of the present invention, the geometrical narrowing has a venturi shape.

Furthermore, the geometrical narrowing of the tube of the PEF chamber according to the present invention may also be accomplished in different ways and by different means. According to one specific embodiment of the present invention, the geometrical narrowing is provided by a compression on opposite sides of the tube. As an example, this may be provided by means of heat compression. Another alternative to also provide the geometrical narrowing is mill off material of the tube and then incorporate units in the holes achieved by milling off. The units incorporated may be the electrodes as such or may be units of suitable material which also has the electrodes attached thereto. With reference to the above disclosed, according to one specific embodiment of the present invention, the geometrical narrowing is provided by one or more incorporation units. The grid mentioned above and further disclosed below can be seen as one such possible incorporation unit.

With reference to the above description it should be noted that any type of geometrical form of the geometrical narrowing is possible according to the present invention, also when applying heat compression to achieve the shape or when using milling off material of the tube, etc. The venture shape is only one example, other possible shapes are e.g. cone shaped one the incoming side and then with a regular shape directly after the narrowing of the cone shape, and shapes where the geometrical narrowing is only provided from one side of the tube and where the other side is totally regular long the entire length.

As mentioned above, the PEF chamber according to the present invention also opens up for other add-ons for a PEF system according to the invention. According to one specific embodiment of the present invention, at least the geometrical narrowing of the tube is contained and embedded in an outer casing to obtain insulation and/or pressure stability. As may be understood from above, not only the narrowing section may be contained and embedded but also parts extending before and after this section may be included. All of the different embodiments of the present invention may be included in such an embedment, but of special interest for such inclusions are the embodiments when there otherwise is an evident risk of leakage. Such leakage is of course by no means acceptable so whenever there might be such risk then the arrangement must be sealed in a secure way, either by using an embedment as disclosed above, or by other means. The material used for embedment may be a suitable moulded plastic or rubber, e.g. liquid plastic. As the unit is intended to be used together with high voltage, the insulting properties are important. Moreover, the actual sections where there is a higher risk of leakage, such as between tube and incorporated electrode units, may be sealed before the embedment, for instance by using silicone or rubber seals or the like.

As disclosed above, the geometrical narrowing of the tube is provided as a geometrical construction limitation to provide a pressure build up. This pressure build up is important to ensure that there is no risk for the formation of gas bubbles where the actual PEF is applied. The PEF is applied by use of electrode units arranged opposite each other at the geometrical narrowing.

Figure 9:
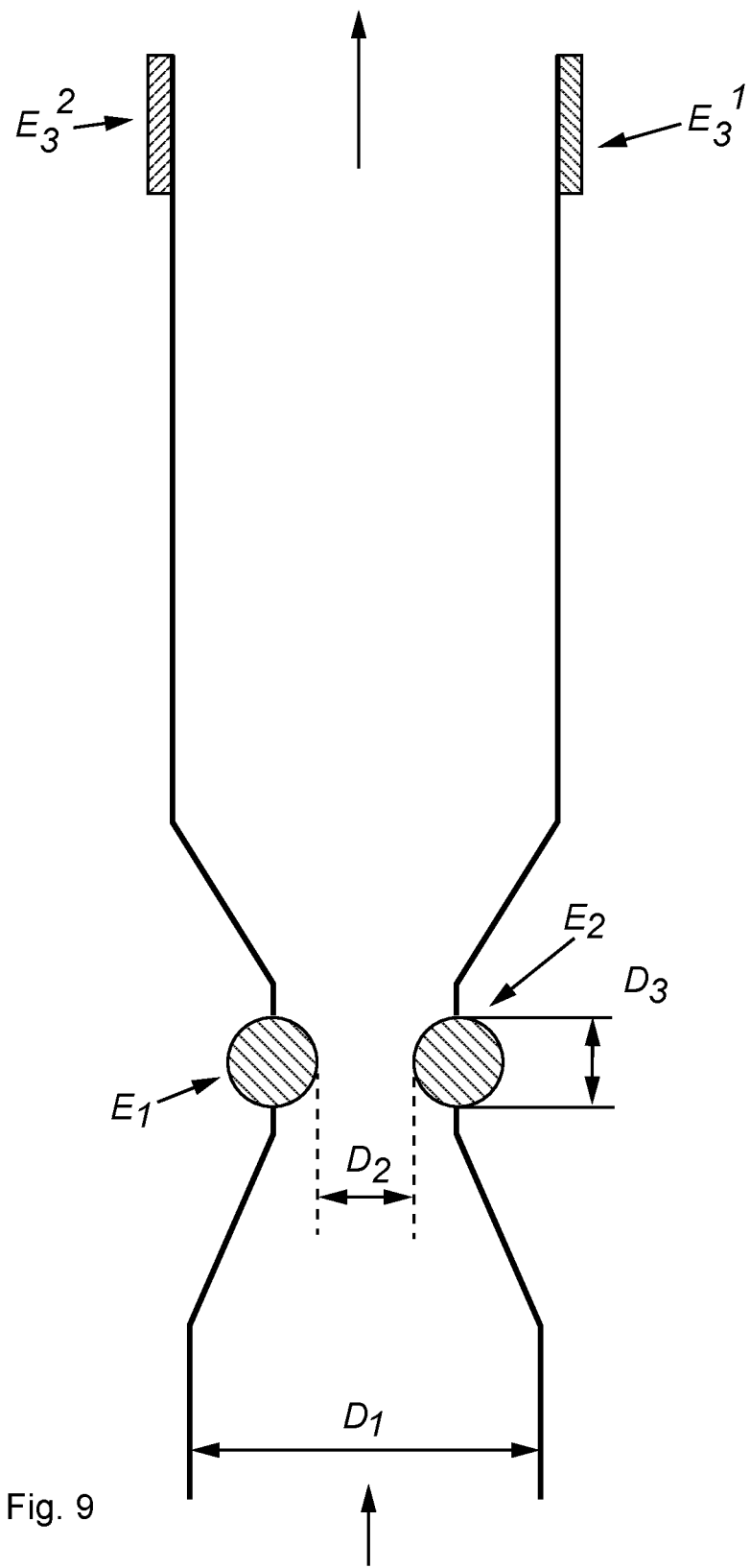
FIG. 9 shows a PEF chamber according to one specific embodiment of the present invention where two round electrodes are arranged to form semi-circular arc surfaces within the tube at the geometrical narrowing.
Figure 10:
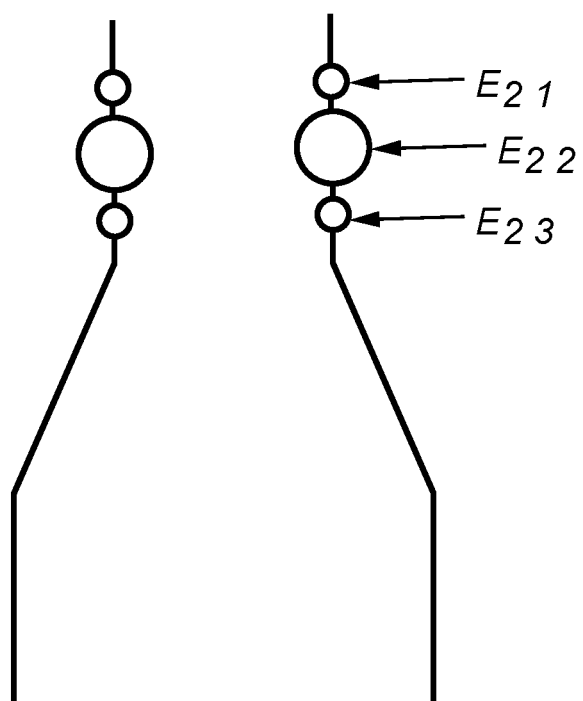
FIG. 10 shows a PEF chamber according to one specific embodiment of the present invention where several round electrodes are provided at the geometrical narrowing.

The electrode units may have different shapes. According to one specific embodiment of the present invention, the electrode units are arranged to form a semi-circular arc surface within the tube. Examples thereof are shown in FIGS. 9 and 10. As seen, the electrodes may be round and arranged so that a semi-circular arc is formed within the tube. As should be understood, other shapes both inside and outside of the tube are possible. The semi-circular arc shape within the tube has the advantage that the part of the electrode being in contact with the liquid or substrate to be treated provides a more homogenous field when the PEF is applied. Furthermore round electrodes without corners also have the advantage of eliminating corner effects. Corner effects may give increased heat in the corners and this affects the distribution of the field when PEF is applied.

Furthermore, according to yet another specific embodiment of the present invention an area provided between electrode units, which is over distance $D_2$ of the inner width IW, is less than 50% of an area provided outside of the geometrical narrowing of the inner width IW, which is over distance $D_1$ of the inner width IW. One example thereof is further depicted in FIG. 9.

Moreover, according to yet another specific embodiment of the present invention, several electrode units are being arranged opposite each other along the geometrical narrowing of the inner width IW along the length L of the tube. According to one embodiment, two or three electrodes are arranged on each side of the tube, together forming two or three electrode pairs. By use of several smaller electrodes, such as smaller round electrodes as shown in FIG. 10, it is possible to simulate one large electrode and distribute the width of the field of the applied PEF in the flow direction without increase the voltage-current with the same factor as the field width.

According to yet another specific embodiment, opposite electrode units are arranged also outside of the geometrical narrowing of the inner width IW along the length L of the tube. One example thereof is seen in FIG. 9 where one such electrode pair is arranged in the tube. Such electrode units may be an earthed tube or electrodes arranged on a distance from the electrode units at the geometrical narrowing as an isolated electrode pair. This is seen in FIG. 9. According to one specific embodiment, a distance between an electrode unit arranged outside of the geometrical narrowing to an electrode unit arranged inside of the geometrical narrowing is at least 10 times, such as in the range of 10-30 times, of a distance between the two electrode units arranged opposite each other at the geometrical narrowing.

The electrode units provided outside of the geometrical narrowing enables an A.C. connection of a generator to the PEF chamber. This is further shown in FIG. 11 and discussed below.

According to another specific embodiment, the PEF chamber comprises a grid of an insulating material and a chamber positioned behind the grid, said chamber behind the grid being connected to a pump. The chamber is connected to the pump via one or more piping. From the pump, an electrical conducting liquid or gel is pumped via the piping and into the chamber. The liquid or gel fills the chamber and is contacted with the substrate being treated via the holes in the grid. The piping going into the chamber is of a conducting material transferring the pulse into the gel or liquid. By this arrangement there is provided an electrode comprising a conducting liquid/gel being in contact with the substrate to be treated. Moreover, the electrode is not consumed as the liquid or gel is replaced continuously.

According to one specific embodiment of the present invention, the geometrical narrowing is flexible. This implies that the section with the geometrical narrowing may flex (may widen) if the applied pressure is too high, implying that the widening of the geometrical narrowing is dependent on the pressure in the chamber. This ability may be provided by different means. According to one embodiment, the material provided in the geometrical narrowing is flexible in itself. The choice of the material should of course be chosen to provide a suitable range of flexibility. According to yet another specific embodiment of the present invention, the geometrical narrowing is spring-loaded or comprises a counterweight unit, such as e.g. a balance system. As an example, the section of the geometrical narrowing of the tube may be arranged with a spring-loaded clip or holder or the like. As one example it may be mentioned that the arrangement may comprise the combination of a tube of a more flexible material which is provided with a spring-loaded clip or holder.

With the incorporation of a spring, the actual spring may press on the side of the tube to create the geometrical narrowing. The spring may be set or adjusted with a set screw and if the pressure is too high in the tube then the spring gives in. Moreover, the set screw may be adjusted to adjust the space between the electrodes. Therefore, according to one specific embodiment of the present invention, the geometrical narrowing is adjustable.

As hinted above, the adjustment screw may be spring-loaded so that the electrodes can flex back when the pressure is high or when larger particles are passing the geometrical narrowing.

As mentioned, the attachment means may be of different types, both as such and also in relation to each other. According to one embodiment, at least one of the attachment means is threaded, is a nut or a flange. It should, however be mentioned that all possible versions which may ensure a secure locking are possible according to the present invention. Also seal units, such as gaskets may be of interest to ensure the secure locking. Another possible alternative then the ones disclosed above is the use of additional locking means for the installation, such as locking arms or the like, to lock the PEF chamber to connecting tubes. Such locking arms may be separate part to use only when installing and removing and replacing a PEF chamber according to the present invention. Also in these cases gaskets, such as e.g.

O-ring gaskets, may be important units to use between the PEF chamber and connecting other units, such as tubing.

Furthermore, the PEF chamber according to the present invention may be a part of a system. This system may e.g. be a plug-in box which is easy to replace as a whole. Such a plug-in box may also be seen as the disposable in a docking system.

As hinted above, also an embedded box comprising the PEF chamber may be such a box system according to the present invention. The box may have connecting devices, such as pins or the like, which are intended to be connected to a fixed box being in contact with the electrical network, when the box is installed in place. Such a box may therefore be provided with different indication means. Therefore, according to one specific embodiment, PEF chamber is part of a box having electrode contact means, i.e. connecting devices, and "in place" indication means. It should be noted that a PEF chamber according to the present invention which is not a part of a box system may still have different indication means, such as e.g. "in place" or "error" indication means. The indication means may be of different type and one example is LED. Another example is a light conductor in the form of a plastic rod that transports the light from the fixed mother connection box. Also other typical warning indicators are totally possible.

Also other indication means are possible. One example is copy protection means. This may be accomplished by different alternatives, such as bar codes, a non-volatile memory that contain serial number, time of use, and other production parameters and the like, etc. Such a memory mentioned above may be altered by the host electrical system during use to foresee expiration time and maximum use time, etc.

The present invention finds use in many different industrial applications. The PEF chamber according to the present invention may be employed in all different areas where PEF technology is of interest. Examples are in the treatment of pumpable liquids, such as different types of foodstuffs, for the treatment of ballast water, and in the hygenization of sludge before being allowed to be spread e.g. in agriculture or further processed in fermentation or biogas production.

DETAILED DESCRIPTION OF THE DRAWINGS

FIG. 1 shows a PEF chamber 1 according to one specific embodiment of the present invention. The PEF chamber 1 comprises a tube 2 with two open ends 3, 4 having attachment means 5, 6 enabling the PEF chamber 1 to be a plug-in device. In this case the attachment means are threaded. As notable, the tube has a geometrical narrowing where the inner width IW is decreased along the length L. At this geometrical narrowing two opposite electrodes 7, 8 are arranged. In this case the two electrodes 7, 8 may have been arranged inside of the PEF chamber tube 2 which tube 2 has been heat compressed or the like at the narrowing.

Figure 2:
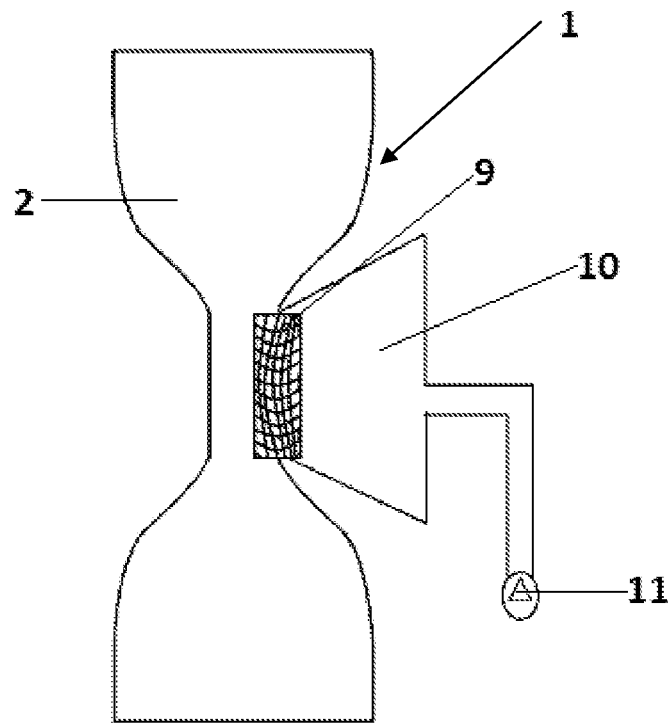
FIG. 2 shows a PEF chamber according to another specific embodiment of the present invention.

FIG. 2 shows a PEF chamber 1 according to another specific embodiment of the present invention. In this case there is a grid 9 of an insulating material arranged at the narrowing. Behind the grid 9 there is a chamber 10 which is connected to a pump 11. This arrangement enables for the use of an electrical conducting liquid or gel being pumped via the piping and into the chamber 10. The liquid or gel fills the chamber 10 and is contacted with the substrate being treated via the holes in the grid 9.

Figure 3:
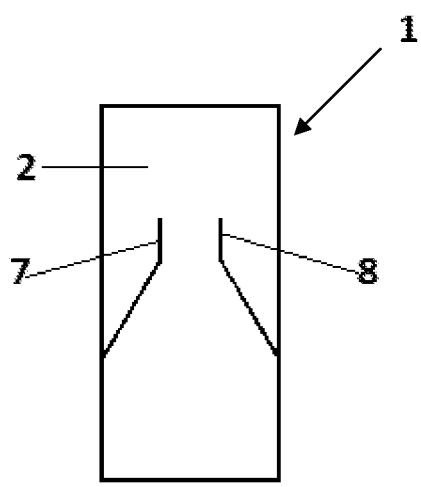
FIG. 3 shows a PEF chamber according to yet another embodiment of the present invention.

FIG. 3 shows a PEF chamber 1 according to yet another embodiment of the present invention. In this case there are two electrodes 7, 8 which have been incorporated together with walls, which may be e.g. plastic walls, into the tube 2.

Figure 4:
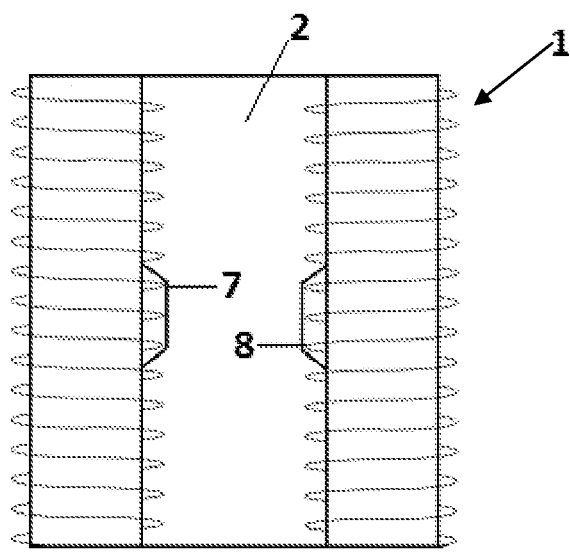
FIG. 4 also shows a PEF chamber according to one specific embodiment of the present invention.

As notable in FIG. 4, where another similar arrangement is shown, it may be needed two fill an outer casing and embed the tube 2 with a suitable moulded plastic or rubber, e.g. liquid plastic. This is shown in FIG. 4 with dashed lines.

Figure 5:
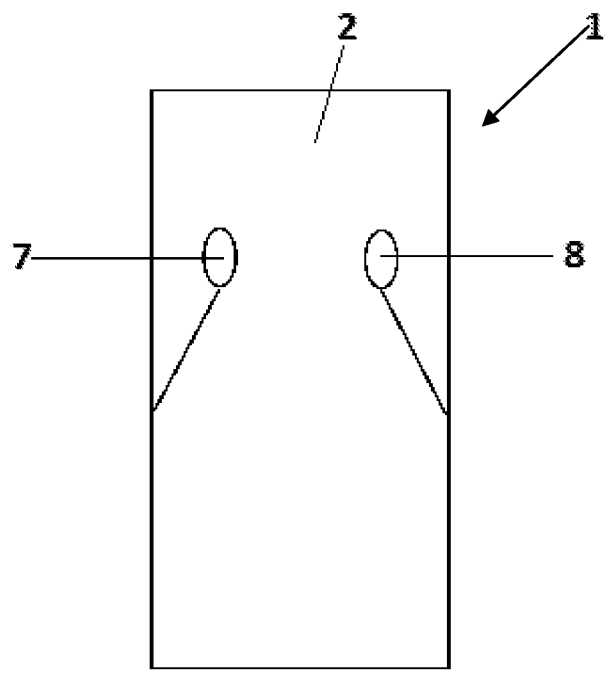
FIG. 5 shows a PEF chamber according to yet another embodiment of the present invention.

FIG. 5 shows a PEF chamber 1 according to yet another embodiment of the present invention. In this case it may be seen that two electrode rods 7, 8 are incorporated into the tube 2 at the geometrical narrowing.

Figure 6:
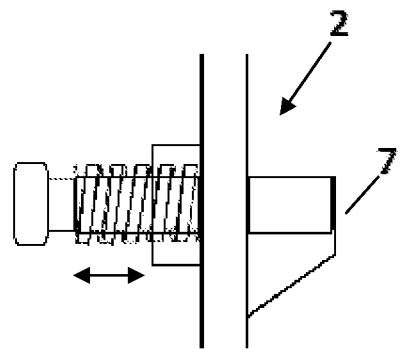
FIG. 6 shows a part of an electrode adjustable PEF chamber according to one specific embodiment of the present invention.

FIG. 6 shows a part of an electrode adjustable PEF chamber 1 according to one specific embodiment of the present invention. As notable, a screw is provided which enables two adjust the position of the electrode 7 and as such the widening of the geometrical narrowing.

Figure 7:
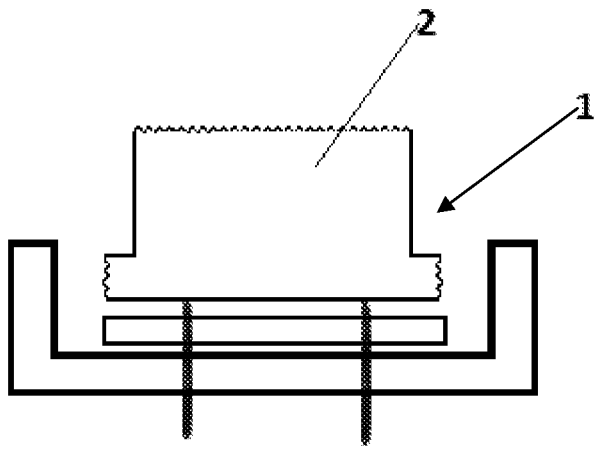
FIG. 7 shows one possible attachment arrangement for a PEF chamber according to one specific embodiment of the present invention.

FIG. 7 shows one possible attachment arrangement for a PEF chamber 1 according to one specific embodiment of the present invention. In this case the arrangement is locked with the connecting piping by use of a flange design. Many other types of locking arrangements are of course possible to use. Also additional means, such as locking arms to secure a tightening, may also be provided.

Figure 8:
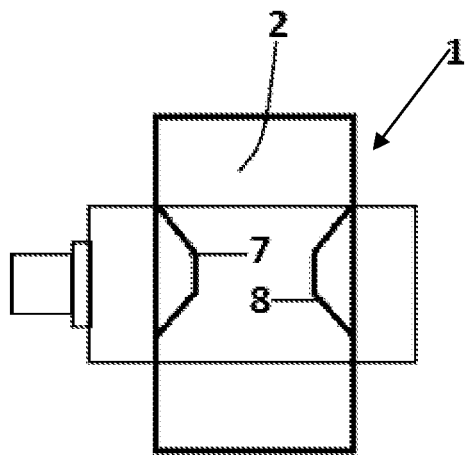
FIG. 8 shows a PEF chamber according to one specific embodiment of the present invention where the PEF chamber is arranged in a box having electrode contact means.

FIG. 8 shows a PEF chamber 1 according to one specific embodiment of the present invention where the PEF chamber 1 is arranged in a box having electrode contact means. This electrode contact means is shown in the most left side of the box.

FIG. 9 shows a PEF chamber according to one specific embodiment of the present invention where two round electrodes ($E_1$ and $E_2$) are arranged to form semi-circular arc surfaces within the tube at the geometrical narrowing. As seen, the distance $D_2$ is about the same as distance $D_3$, however the area over $D_2$ is normally less than 50% of the area over distance $D_1$, which is the width of the tube outside of the geometrical narrowing. The suitable areas are of course dependent on the flow and type of liquid to process.

Moreover, an isolated electrode pair ($E_3^1$ and $E_3^2$), which is earthed, is arranged at a distance from the geometrical narrowing and the electrodes there. The distance between $E_1$ and $E_2$ to $E_3^1$ and $E_3^2$, respectively, is typically 10-30 times longer than the distance between $E_1$ and $E_2$. This has the advantage that the current first passes the capacitor and the substrate/liquid to treat via the two nearby electrodes at the geometrical narrowing. When the pulse is finished the capacitor has been charged and then the current instead passes via the more distant electrodes and then back to one of the electrodes at the geometrical narrowing. In this way there is provided a fast short pulse in one direction and subsequently a longer pulse in an opposite direction which discharges the capacitor.

FIG. 10 shows a PEF chamber according to one specific embodiment of the present invention where several round electrodes ($E_{2,1}$, $E_{2,2}$, $E_{2,3}$) are provided at the geometrical narrowing. This solution is also possible to incorporate as an alternative in the example shown in FIG. 9, wherein also earthed electrodes outside of the geometrical narrowing are arranged.

The earthed electrodes shown in FIG. 9 enable an A.C. connection of the generator to the PEF chamber. By use of such an electrode pair ($E_3^1$ and $E_3^2$) an A.C. connection may be used as shown in an example in FIG. 11. The A.C. connection has the advantage that the energy consumption is reduced och that a bipolar pulse is created as the capacitor is charged.

Figure 11:
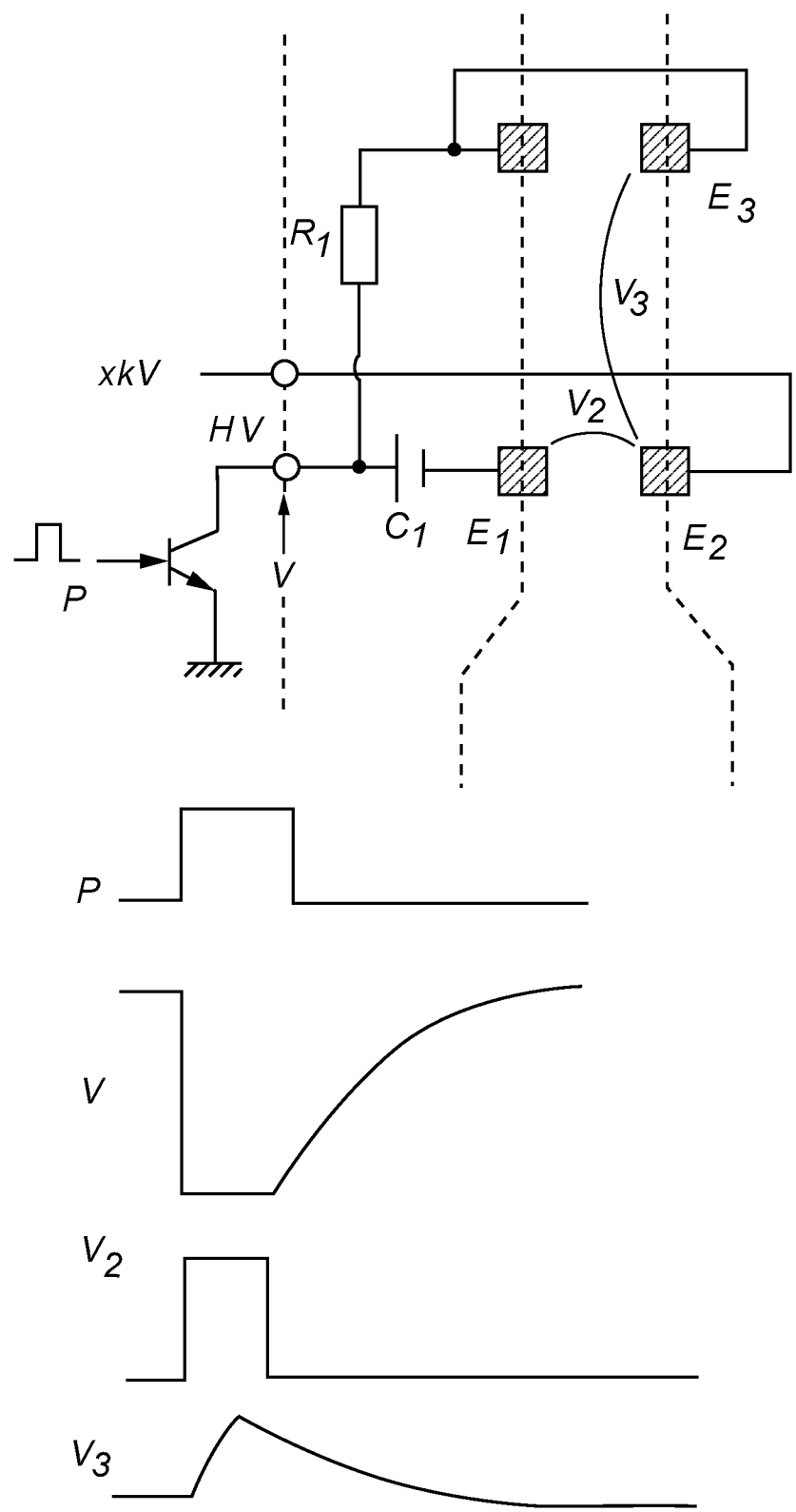
FIG. 11 shows an example of a circuit diagram of a system comprising a PEF chamber according to one specific embodiment of the present invention. Possible graphs of the pulse P, voltage V and pulses $V_2$ and $V_3$ are also provided.

As a further explanation of the FIG. 11, electrodes $E_1$ and $E_2$ are arranged at the geometrical narrowing of the PEF chamber. These are connected to the pulse source HV via the capacitor $C_1$. When the pulse P is applied, then $C_1$ is charged, which renders voltage V to be located in the capacitor $C_1$ when the pulse P is finished. At the same time, the pulse $V_2$ appears between the electrodes $E_1$ and $E_2$. An optional resistor $R_1$ may be arranged in the system so that the capacitor $C_1$ is discharged via a third electrode $E_3$ to electrode $E_2$, which renders a pulse $V_3$ between $E_3$ and $E_2$. The current between the electrode $E_2$ and the substrate or liquid to treat will have two directions. This renders a reduced material loss in the electrode and renders a better treatment of the substrate or liquid.

As said, the electrode $E_3$ may be a separate and isolated electrode, but can in fact also be part of the installation if a tube of conductive material is used. In such a case a floating generator having a "virtual floating earth" is suitable to use in the installation.

The invention claimed is:

1. PEF chamber, said PEF chamber comprising a tube with two open ends having attachment means enabling the PEF chamber to be a plug-in device, wherein the tube has a length L from one open end to the other open end and an inner width IW from one side of the tube to the other side of the tube in a cross section being perpendicular to the length L thereof,
   wherein the tube has a geometrical narrowing of the inner width IW somewhere along the length L of the tube,
   wherein the PEF chamber comprises a grid of an insulating material being arranged at the geometrical narrowing or electrode units being arranged opposite each other at the geometrical narrowing of the inner width IW along the length L of the tube, and
   wherein the electrode units are arranged to form a semicircular arc surface within the tube.

2. PEF chamber according to claim 1, wherein the tube of the PEF chamber is non-conductive.

3. PEF chamber according to claim 1, wherein the geometrical narrowing has a venturi shape.

4. PEF chamber according to claim 1, wherein the geometrical narrowing is provided by a compression on opposite sides of the tube.

5. PEF chamber according to claim 1, wherein the geometrical narrowing is provided by one or more incorporation units.

6. PEF chamber according to claim 1, wherein at least the geometrical narrowing of the tube is contained and embedded in an outer casing to obtain insulation and/or pressure stability.

7. PEF chamber according to claim 1, wherein the geometrical narrowing of the tube is provided as a geometrical construction limitation to provide a pressure build up.

8. PEF chamber according to claim 1, wherein an area provided between electrode units, which is over distance D2 of the inner width IW, is less than 50% of an area provided outside of the geometrical narrowing of the inner width IW, which is over distance $D_1$ of the inner width IW.

9. PEF chamber according to claim 1, wherein several electrode units are being arranged opposite each other along the geometrical narrowing of the inner width IW along the length L of the tube.

10. PEF chamber according to claim 1, wherein opposite electrode units are arranged also outside of the geometrical narrowing of the inner width IW along the length L of the tube.

11. PEF chamber according to claim 10, wherein a distance between an electrode unit arranged outside of the geometrical narrowing to an electrode unit arranged inside of the geometrical narrowing is at least 10 times of a distance between the two electrode units arranged opposite each other at the geometrical narrowing.

12. PEF chamber according to claim 1, wherein the PEF chamber comprises a grid of an insulating material and a chamber positioned behind the grid, said chamber behind the grid being connected to a pump.

13. PEF chamber according to claim 1, wherein the geometrical narrowing is flexible.

14. PEF chamber according to claim 1, wherein the geometrical narrowing is adjustable.

15. PEF chamber according to claim 1, wherein at least one of the attachment means is threaded, is a nut or a flange.

16. PEF chamber according to claim 1, wherein the PEF chamber is part of a box having electrode contact means and "in place" indication means, "error" indication means and/or memory means.

17. A PEF chamber, said PEF chamber comprising a tube with two open ends having attachment means enabling the PEF chamber to be a plug-in device,
   wherein the tube has a length L from one open end to the other open end and an inner width IW from one side of the tube to the other side of the tube in a cross section being perpendicular to the length L thereof,
   wherein the tube has a geometrical narrowing of the inner width IW somewhere along the length L of the tube,
   wherein the PEF chamber comprises a grid of an insulating material being arranged at the geometrical narrowing or electrode units being arranged opposite each other at the geometrical narrowing of the inner width IW along the length L of the tube, and
   wherein the PEF chamber comprises a grid of an insulating material and a chamber positioned behind the grid, said chamber behind the grid being connected to a pump.

* * * * *